(12) United States Patent
Nagao

(10) Patent No.: US 11,461,079 B2
(45) Date of Patent: Oct. 4, 2022

(54) NON-TRANSITORY COMPUTER-READABLE MEDIUM

(71) Applicant: FUJITSU LIMITED, Kawasaki (JP)

(72) Inventor: Takahiro Nagao, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/204,468

(22) Filed: Mar. 17, 2021

(65) Prior Publication Data

US 2021/0397424 A1    Dec. 23, 2021

(30) Foreign Application Priority Data

Jun. 22, 2020 (JP) .............................. JP2020-107175

(51) Int. Cl.
| | | |
|---|---|---|
| *G06F 9/44* | (2018.01) | |
| *G06F 9/455* | (2018.01) | |
| *G06F 8/41* | (2018.01) | |
| *G06F 8/70* | (2018.01) | |
| *G06F 8/20* | (2018.01) | |

(52) U.S. Cl.
CPC ................ *G06F 8/433* (2013.01); *G06F 8/20* (2013.01); *G06F 8/70* (2013.01)

(58) Field of Classification Search
CPC ............... G06F 8/433; G06F 8/20; G06F 8/70
See application file for complete search history.

(56) References Cited

U.S. PATENT DOCUMENTS

| | | | | |
|---|---|---|---|---|
| 2010/0192129 A1* | 7/2010 | Langworthy | ........... | G06F 8/437 717/126 |
| 2012/0271435 A1* | 10/2012 | Weber | ...................... | G06N 5/00 700/1 |
| 2014/0053136 A1* | 2/2014 | Pistoia | ..................... | G06F 8/75 717/126 |

(Continued)

FOREIGN PATENT DOCUMENTS

| | | | | |
|---|---|---|---|---|
| CN | 110781086 A | * | 2/2020 | .......... G06F 11/3628 |
| JP | H011-110195 A | | 4/1999 | |

(Continued)

OTHER PUBLICATIONS

Daniel Le Berre, On SAT Technologies for dependency management and beyond, 2013, pp. 1-5. https://hal.archives-ouvertes.fr/hal-00870846/file/W5_PX_Le_Berre_On_SAT_technologies_for_dependency_management_and_beyond.pdf (Year: 2013).*

(Continued)

*Primary Examiner* — Mongbao Nguyen
(74) *Attorney, Agent, or Firm* — Fujitsu Patent Center

(57) ABSTRACT

A non-transitory computer-readable medium having stored therein a program for causing a computer to execute a process, the process includes detecting a conflict between a first library and a second library in a first program based on a first definition file indicating that the first program depends on the first library and the second library among a plurality of libraries, generating a logical formula indicating that the first program depends on the first library and does not depend on the second library, and outputting a second (Continued)

definition file indicating that the first program depends on the first library and does not depend on the second library when the logical formula is determined to be satisfiable.

1 Claim, 23 Drawing Sheets

(56) References Cited

U.S. PATENT DOCUMENTS

| | | | |
|---|---|---|---|
| 2015/0227363 A1* | 8/2015 | Pillgram-Larsen | G06F 8/71 717/122 |
| 2015/0268948 A1 | 9/2015 | Plate | |
| 2016/0253625 A1* | 9/2016 | Casey | G06F 9/44521 717/101 |
| 2016/0328230 A1* | 11/2016 | Schneider | G06F 8/72 |
| 2017/0075684 A1 | 3/2017 | Forguson et al. | |
| 2018/0181485 A1 | 6/2018 | Simbara et al. | |
| 2018/0246706 A1* | 8/2018 | Fan | G06F 8/443 |
| 2019/0129825 A1* | 5/2019 | Bardin | G06F 11/3612 |
| 2020/0125339 A1* | 4/2020 | Wong | G06F 8/71 |
| 2021/0173621 A1* | 6/2021 | Fender | G06F 8/71 |
| 2021/0349738 A1* | 11/2021 | Seshadri | G06F 8/71 |
| 2021/0365253 A1* | 11/2021 | Zhai | G06F 8/433 |

FOREIGN PATENT DOCUMENTS

| | | |
|---|---|---|
| JP | 2006-079534 A | 3/2006 |
| WO | 2016/174743 A1 | 11/2016 |

OTHER PUBLICATIONS

Jibesh Patra, ConflictJS: Finding and Understanding Conflicts Between JavaScript Libraries, 2018, pp. 741-750. https://ieeexplore.ieee.org/stamp/stamp.jsp?tp=&arnumber=8453147 (Year: 2018).*

Apache Maven Project, Apache Software Foundation, [online] Internet < https://maven.apache.org/>, Search on May 7, 2020 (Total 1 page).

OSGi Alliance, The Dynamic Module System for Java, [online] Internet < https://www.osgi.org/>, Search on May 7, 2020 (Total 3 pages).

Michael Schroeder, "Using SAT for Solving Package Dependencies", Novell, Inc., [online] Internet <https://en.opensuse.org/images/b/b9/Fosdem2008-solver.pdf>, Search on May 7, 2020 (Total 15 pages).

Chris Tucker et al., "OPIUM: Optimal Package Install/Uninstall Manager", In Proc. ICSE 2007, pp. 1-10 (Total 10 pages).

* cited by examiner

FIG. 1

```
<project>
    <groupId>com.example</groupId>
    <artifactId>prjA</artifactId>     ----1a
    <version>1.0</version>
    <dependencies>
        <dependency>
            <groupId>com.example</groupId>
            <artifactId>libA</groupId>     ----1b
            <version>2.0</version>
        </dependency>
        <dependency>
            <groupId>com.example</groupId>
            <artifactId>libB</artifactId>     ----1c
            <version>2.0</version>
        </dependency>
        <dependency>
            <groupId>com.example</groupId>
            <artifactId>libC</artifactId>     ----1d
            <version>1.1</version>
        </dependency>
    </dependencies>
</project>
```

```
<project>
   <groupId>com.example</groupId>
   <artifactId>prjA</artifactId>
   <version>1.0</version>
   <dependencies>
      <dependency>                                         ---1b
         <groupId>com.example</groupId>
         <artifactId>libA</groupId>
         <version>2.0</version>
         <!-- exclude libB and libC -->
         <exclusions>
            <exclusion>                                    ---1f
               <groupId>com.example</groupId>
               <artifactId>libB</artifactId>
            </exclusion>
            <exclusion>                                    ---1g
               <groupId>com.example</groupId>
               <artifactId>libC</artifactId>
            </exclusion>
         </exclusions>
      </dependency>
      <dependency>
         <groupId>com.example</groupId>
         <artifactId>libB</artifactId>
         <version>2.0</version>
      </dependency>
      <dependency>
         <groupId>com.example</groupId>
         <artifactId>libC</artifactId>
         <version>1.1</version>
      </dependency>
   </dependencies>
</project>
```

| PROPOSITIONAL VARIABLE | PRESENCE OR ABSENCE OF CONFLICT |
|---|---|
| prjA | NO CONFLICT |
| libA-2.0 | NO CONFLICT |
| libB-1.0 | CONFLICT |
| libB-2.0 | CONFLICT |
| libC-1.0 | CONFLICT |
| libC-1.1 | CONFLICT |

| LOGICAL FORMULA | MEANING |
|---|---|
| A | LIBRARY A IS USED |
| ¬A | LIBRARY A IS NOT USED |
| ¬A ∨ B | LIBRARY A DEPENDS ON LIBRARY B |
| ¬A ∨ ¬B | LIBRARY A AND LIBRARY B CONFLICT WITH EACH OTHER |

FIG. 14A

```
result: sat
model: prjA=true, libA-2.0=true, libB-2.0=true, libC-1.1=true
```

FIG. 14B

```
result: unsat
unsat-core: clause01, clause02, clause03, clause05, clause08
```

FIG. 17A

```
<hint>
   <groupId>com.example</groupId>
   <artifactId>libB</artifactId>                    ----41a
   <substitutable>
      <target>[1.0,2.0)</target>   <!-- 1.0 <= x < 2.0 -->   ----41b
      <by>[2.0,3.0)</by>           <!-- 2.0 <= x < 3.0 -->
   </substitutable>
</hint>
```
41

FIG. 17B

```
<hint>
   <groupId>com.example</groupId>
   <artifactId>libB</artifactId>                    ----41a
   <substitutable>
      <target>[2.0,3.0)</target>   <!-- 2.0 <= x < 3.0 -->   ----41b
      <by>[1.0,2.0)</by>           <!-- 1.0 <= x < 2.0 -->
   </substitutable>
</hint>
```
41

FIG. 18A prjA ∧
(¬prjA ∨ libA-2.0) ∧ (¬libA-2.0 ∨ libB-2.0) ∧ (¬libB-2.0 ∨ libC-1.1) ∧
(¬prjA ∨ libB-2.0) ∧ (¬libB-2.0 ∨ libC-1.1) ∧
(¬prjA ∨ libC-1.1) ∧
23f ⋯ (¬libB-1.0 ∨ ¬libB-2.0) ∧ (¬libC-1.0 ∨ ¬libC-1.1)
                                          23j                    23g

24

FIG. 18B prjA ∧
(¬prjA ∨ libA-2.0) ∧ (¬libA-2.0 ∨ libB-1.0) ∧ (¬libB-1.0 ∨ libC-1.0) ∧
                                    23j                   23e                     23g
(¬prjA ∨ libB-2.0) ∧
(¬prjA ∨ libC-1.1) ∧ (¬libC-1.0 ∨ ¬libC-1.1) ⋯ 23i
23d ⋯ 
23h ⋯ 
23f ⋯ (¬libB-1.0 ∨ ¬libB-2.0) ∧

```
<project>
   <groupId>com.example</groupId>
   <artifactId>prjA</artifactId>
   <version>1.0</version>
   <dependencies>
      <dependency>                                           ----26a
         <groupId>com.example</groupId>
         <artifactId>libA</groupId>
         <version>2.0</version>
         <!-- exclude libB and libC -->
         <exclusions>
            <exclusion>
               <groupId>com.example</groupId>              ----26b
               <artifactId>libB</artifactId>
            </exclusion>
            <exclusion>
               <groupId>com.example</groupId>              ----26c
               <artifactId>libC</artifactId>
            </exclusion>
         </exclusions>
      </dependency>
      <dependency>
         <groupId>com.example</groupId>
         <artifactId>libB</artifactId>
         <version>2.0</version>
      </dependency>
      <dependency>
         <groupId>com.example</groupId>
         <artifactId>libC</artifactId>
         <version>1.1</version>
      </dependency>
   </dependencies>
</project>
```

```
conflicting libraries:
  libC-1.0
     required by libB-1.0
     required by libA-2.0
     required by prjA
  libC-1.1
     required by prjA
```

```
<hint>
    <groupId>com.example</groupId>
    <artifactId>libB</artifactId>
    <substitutable>
        <target>[2.0,3.0)</target>
        <by>[1.0,2.0)</by>
    </substitutable>
</hint>
<hint>
    <groupId>com.example</groupId>
    <artifactId>libC</artifactId>         ---- 41c
    <substitutable>
        <target>1.0</target>        ---- 41d
        <by>1.1</by>
    </substitutable>
</hint>
```

41

NON-TRANSITORY COMPUTER-READABLE MEDIUM

CROSS-REFERENCE TO RELATED APPLICATION

This application is based upon and claims the benefit of priority of the prior Japanese Patent Application No. 2020-107175 filed on Jun. 22, 2020, the entire contents of which are incorporated herein by reference.

FIELD

A certain aspect of the embodiments is related to a non-transitory computer-readable medium.

BACKGROUND

In program development, a library including a set of a plurality of classes and functions may be used. By referring to the library, the program can use the classes and the functions in the library.

The library may be updated frequently, and there may be different versions of libraries with the same name. Hereinafter, a state that a single program refers to the plurality of libraries with the same name but different versions is called a conflict between the libraries.

When the conflict between the libraries occurs in a source program, a compiler cannot determine which library to call from the plurality of libraries, and hence the compiler cannot generate an executable program. Therefore, when the conflict between the libraries occurs, a build tool such as the compiler select a library using a method dependent on the tool and eliminate the conflict between the libraries.

However, in this case, the library intended by a program developer is not always selected, and an executable program different from the developer's intention may be generated.

Note that the technique related to the present disclosure is disclosed in Japanese Laid-open Patent Publication Nos. 2006-79534 and No. 11-110195, International Publication No. WO2016/174743, and U.S. Patent Application Publication Nos. 2017/0075684 and No. 2015/0268948. Further, note that the technique related to the present disclosure is disclosed in (1) Apache Maven Project, [online], [Search on May 7, 2020], Internet <https://maven.apache.org/>, (2) OSGi Alliance, [online], [Search on May 7, 2020], Internet <https://www.osgi.org/>. (3) M. Schroeder, "Using SAT for solving package dependencies", [online], [Search on May 7, 2020], Internet <https://en.opensuse.org/images/b/b9/Fosdem2008-solver.pdf>, and (4) Chris Tucker et al., "OPIUM: Optimal Package Install/Uninstall Manager", In Proc. ICSE 2007, pages 178-188.

SUMMARY

According to an aspect of the present disclosure, there is provided a non-transitory computer-readable medium having stored therein a program for causing a computer to execute a process, the process including detecting a conflict between a first library and a second library in a first program based on a first definition file indicating that the first program depends on the first library and the second library among a plurality of libraries, generating a logical formula indicating that the first program depends on the first library and does not depend on the second library, and outputting a second definition file indicating that the first program depends on the first library and does not depend on the second library when the logical formula is determined to be satisfiable.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a schematic diagram illustrating a description example of a POM file;

FIG. 4 is a schematic diagram of a modified POM file;

FIG. 8 is a schematic diagram of a list according to the first embodiment;

FIG. 9 is a schematic diagram illustrating a rule for encoding a dependency relationship of libraries into a logical formula in the first embodiment;

FIGS. 14A and 14B are schematic diagrams illustrating examples of determination results of a satisfiability determination unit according to the first embodiment;

FIG. 17A is a schematic diagram illustrating an example of hint information according to the second embodiment;

FIG. 17B is a schematic diagram illustrating another example of the hint information according to the second embodiment;

FIG. 18A is a schematic diagram illustrating a logical formula obtained when the hint information of FIG. 17A is used;

FIG. 18B is a schematic diagram illustrating a logical formula obtained when the hint information of FIG. 17B is used;

FIG. 19 is a schematic diagram of a POM file corresponding to the logical formula of FIG. 18A;

FIG. 20 is a schematic diagram of conflict information output by the file output device according to the second embodiment when the hint information of FIG. 17B is used;

FIG. 21 is a schematic diagram illustrating modified hint information in the second embodiment;

DESCRIPTION OF EMBODIMENTS

Figure 2:
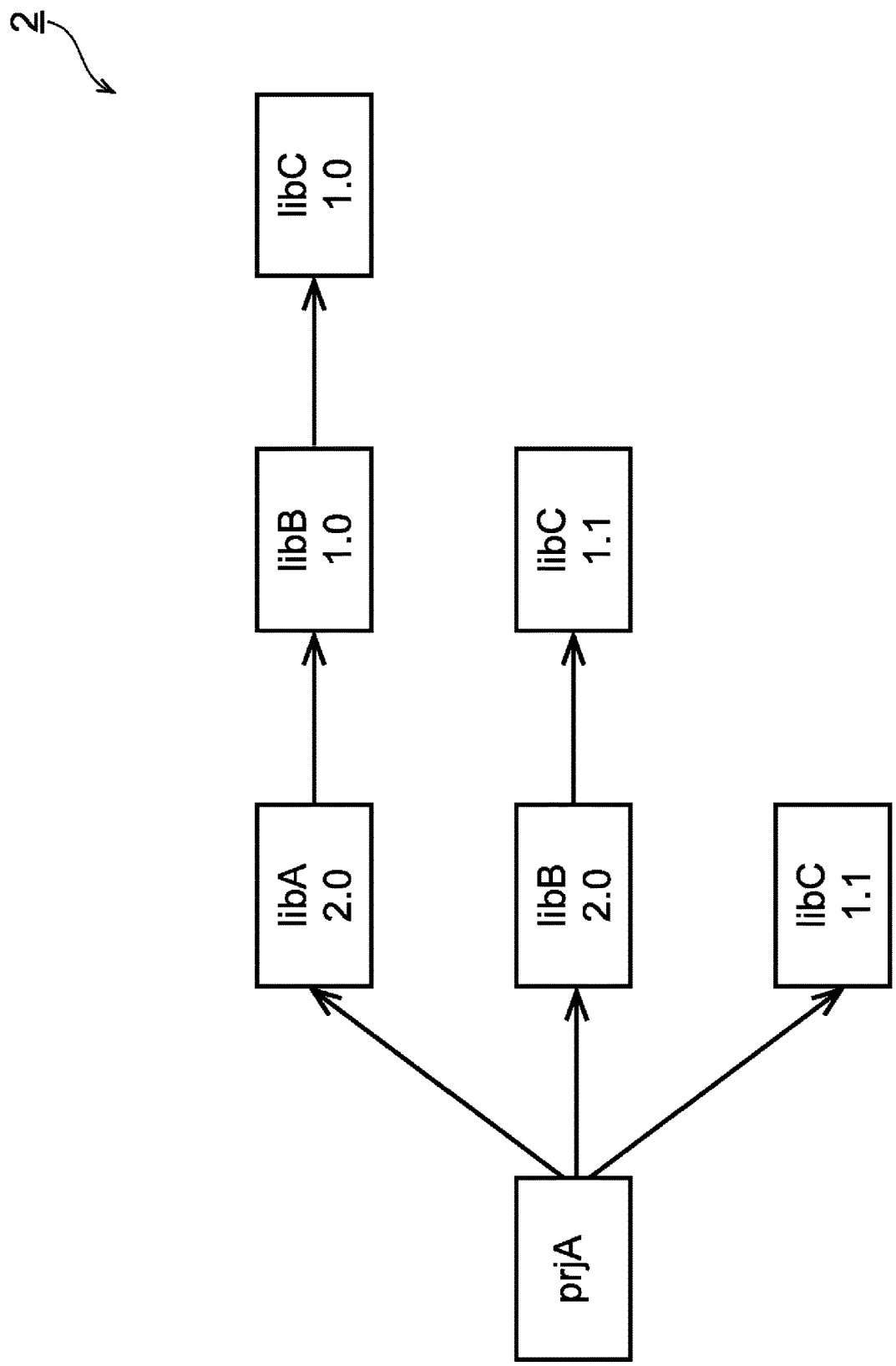
FIG. 2 is a schematic diagram of a dependency graph generated by Maven based on the POM file.

Prior to the description of the present embodiment, matters studied by an inventor will be described.

First, a description will be given of a case where build is executed with Maven which is a build tool for Java (registered trademark), as an example.

When the build is executed with the Maven, the build is executed based on a POM (Project Object Model) file, which is a build definition file, and a Java (registered trademark) source program.

FIG. 1 is a schematic diagram illustrating a description example of the POM file. A POM file 1 is a build definition file that defines a library on which a Java (registered trademark) source program depends. In the example in FIG. 1, an artifactId element 1a identifies a name of the Java (registered trademark) source program as a project "prjA".

When the project "prjA" refers to the class and the function defined in a certain library, this means that the project "prjA" depends on the library. Such a dependency relationship between the library and the project is identified by dependency elements 1b to 1d. For example, the dependency element 1b identifies that the project "prjA" depends on a library "libA" with a version "2.0".

Similarly, the dependency element 1c identifies that the project "prjA" depends on a library "libB" with a version "2.0". Then, the dependency element Id identifies that the project "prjA" depends on a library "libC" with a version "1.1".

FIG. 2 is a schematic diagram of a dependency graph generated by Maven based on the POM file 1.

A dependency graph 2 illustrates the dependency relationship by a directed graph from a dependency source to a dependency destination. For example, the dependency graph 2 illustrates that the project "prjA" depends on each of the libraries "libA", "libB", and "libC" as described above.

Also, each library may depend on further another library. In this example, the library "libA," with the version "2.0" depends on the library "libB" with a version "1.0". This example means that the library "libA" with the version "2.0" refers to the functions and the classes in the library "libB" with the version "1.0".

Such a dependency relationship between the libraries is defined in the POM file included in each library. In the above example, the dependency relationship with the library "libB" with the version "1.0" is defined in the POM file included in the library "libA" with the version "2.0".

In the example of FIG. 2, the project "prjA" depends on two libraries "libB" with different versions "1.0" and "2.0". When a certain program refers to the plurality of libraries with the same name but different versions as mentioned above, this means that the conflict between the libraries occurs in the program. The conflict between the libraries "libB" occurs in the project "prjA". Similarly, the conflict between the libraries "libC" also occurs in the project "prjA".

When the libraries conflict with each other, the Maven selects only one of the plurality of conflict ng libraries using graph search.

Figure 3:
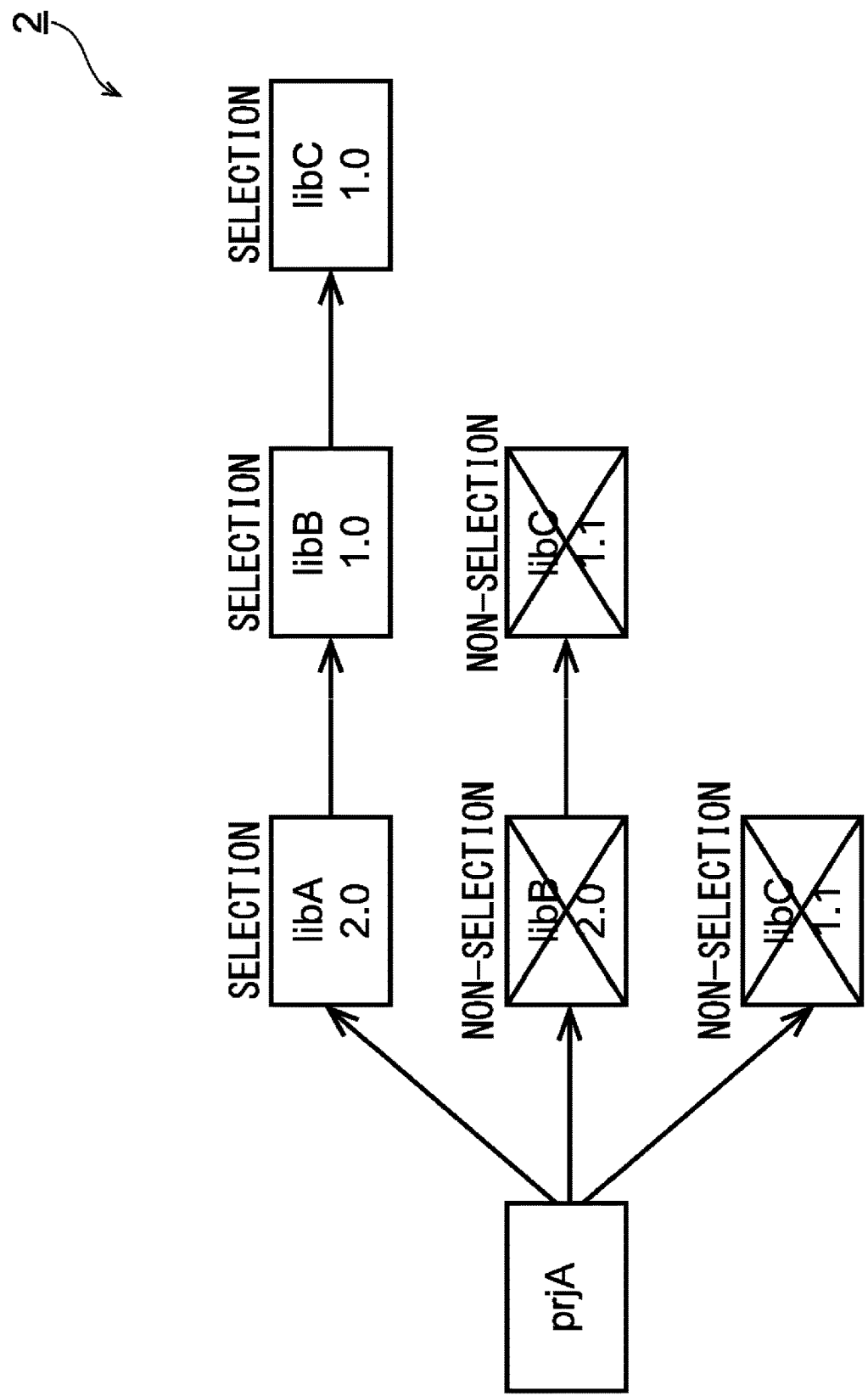
FIG. 3 is a schematic diagram of graph search.

FIG. 3 is a schematic diagram of the graph search. When searching the dependency graph 2 in depth-first search as illustrated in FIG. 3, the Maven selects the library found first and does not select the libraries with the same name found later.

When the depth-first search is performed in this example, the library "libA" with the version "2.0", the library "libB" with the version "1.0", and the library "libC" with the version "1.0" are found in this order. Since these libraries do not conflict with each other, the Maven selects them as the libraries referenced by the project "prjA".

On the other hand, the library "libB" with the version "2.0" conflicts with the library "libB" with the version "1.0" and is found after the library "libB" with the version "1.0". Therefore, the Maven does not select the library "libB" with the version "2.0". For the same reason, the Maven also does not select the library "libC" with the version "1.1".

This roughly solves the conflict between the libraries. However, in this case, the library not intended by the developer may be selected, and the program intended h the developer may not be obtained. For example, in the above example, when the project "prjA" refers to a resource such as the functions and the classes defined only in the library "libB" with the version "2.0", a problem arises that the project "prjA" cannot refer to the resource because the library "libB" with the version "1.0" is selected.

The developer modifies the POM file 1, which can avoid such a problem.

FIG. 4 is a schematic diagram of the modified POM file 1. In this example, the developer describes exclusion elements 1f and 1g inside the dependency element 1b for identifying that the project "prjA" depends on the library "libA".

The exclusion element 1f is an element indicating that the library "libB" is not used inside the library "libA" even when the library "libA" depends on the library "libB". Similarly, the exclusion element 1g is an element indicating that the library "libC" is not used inside the library "libA" even when the library "libA" depends on the library "libC".

Figure 5:
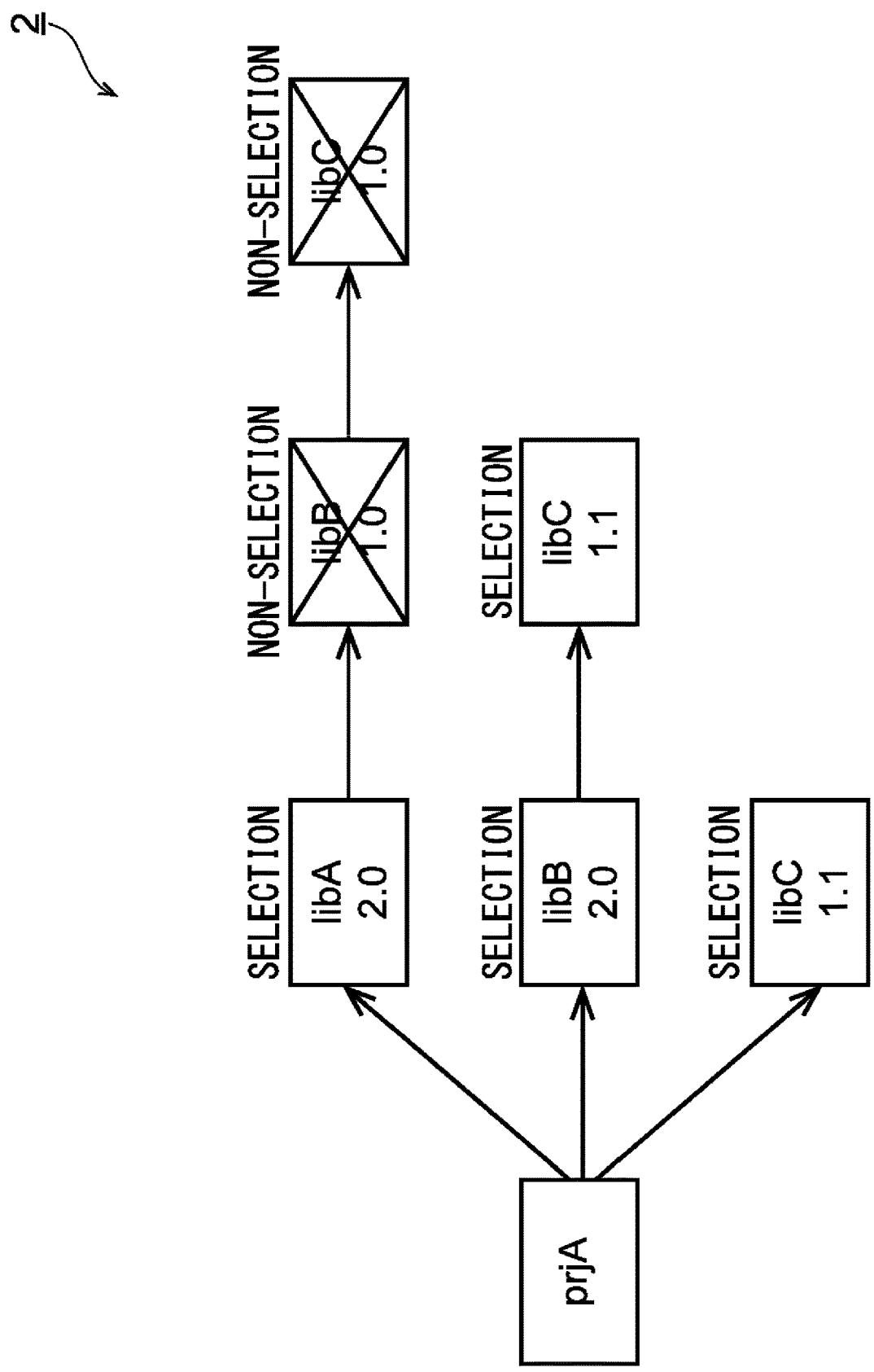
FIG. 5 is a schematic diagram of the dependency graph generated by the Maven based on the POM file of FIG. 4.

FIG. 5 is a schematic diagram of the dependency graph generated by the Maven based on the POM file 1 of FIG. 4.

Since the libraries "libB" and "libC" are excluded from the library "libA" by the exclusion elements 1f and 1g as described above, the libraries "libB" and "libC" corresponding to child nodes of the library "libA" are not selected in the dependency graph 2.

This causes the Maven to select the library "libB" with the version "2.0", so that the project "prjA" can refer to the resource defined only in the library "libB" with the version "2.0".

Instead of using the exclusion elements 1f and 1g in this way, the description of library "libA" may be moved after the descriptions of the libraries "libB" and "libC" in the POM file 1. This also causes the Maven to exclude the libraries "libB" and "libC" corresponding to the child nodes of the library "libA", as in FIG. 5.

Figure 6:
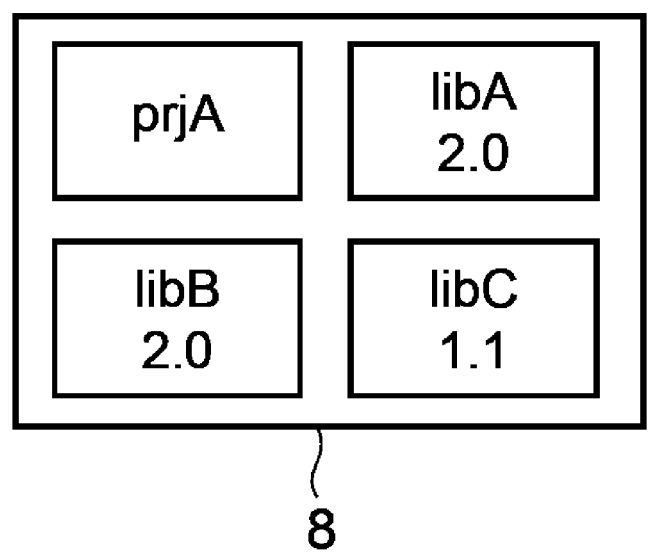
FIG. 6 is a schematic diagram of a JAR file generated by the Maven based on the POM file of FIG. 4.

FIG. 6 is a schematic diagram of a JAR file generated by the Maven based on the POM file 1 of FIG. 4.

A JAR file 8 is an executable program generated by the Maven and includes the libraries "libA", "libB", and "libC" selected in the dependency graph 2 of FIG. 5. Since the conflict between the libraries is resolved, the JAR file 8 becomes the executable program that can operate independently without having to add another JAR file to a classpath.

As described above, the developer can resolve the conflict between the libraries by modifying, the POM file 1 as illustrated in FIG. 4, and can obtain an executable program that can operate independently. However, when the dependency relationship between the libraries is complicated, manually modifying the POM file as illustrated in FIG. 4 is a complicated task, which is an obstacle to the efficiency of the program development.

First Embodiment

Figure 7:
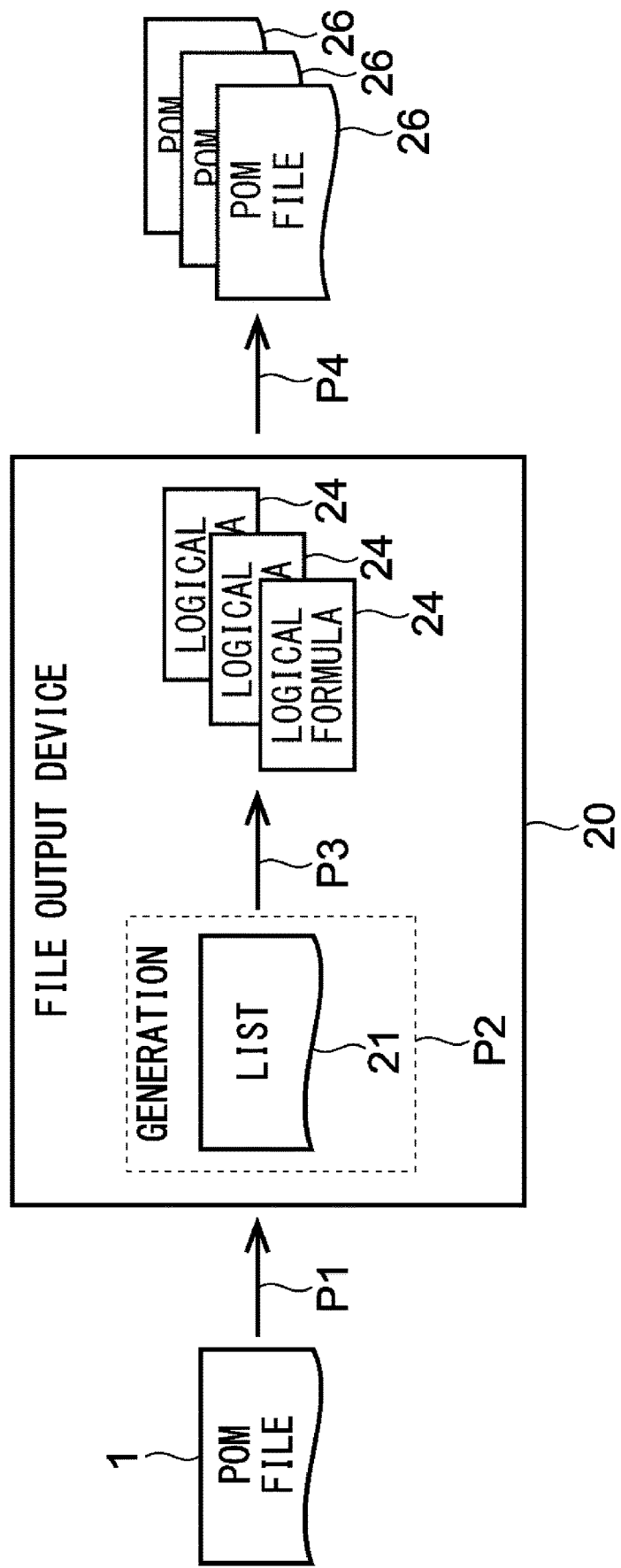
FIG. 7 is a schematic diagram illustrating the process of a file output device according to a first embodiment.

FIG. 7 is a schematic diagram illustrating the process of a file output device according to a first embodiment.

A file output device 20 is a computer such as a server or a PC (Personal Computer), and modifies the POM file in the following way to resolve the conflict between the libraries.

First, the file output device 20 receives the input of the POM file 1 (P1). The POM file 1 is the build definition file that defines the library on which the Java (registered trademark) source program depends, as described with reference to FIG. 1. Since the contents of the POM file 1 are the same as those in FIG. 1, the description thereof is omitted. The POM file 1 is an example of a first definition file.

Next, the file output device 20 generates a list 21 indicating whether the libraries used by the Java (registered trademark) source program conflict with each other based on the POM file 1 (P2).

FIG. 8 is a schematic diagram of the list 21. In this embodiment, since the library is used as a propositional variable of the logical formula as described later, the library is stored in a column of the propositional variable of the list 21. Here, a format in which the library name and the version are coupled with a hyphen is adopted as the format of the library. For example, "libA-2.0" indicates the library "libA" with the version "2.0". Further, in this example, the project "prjA" indicating the source program is also stored as the propositional variable.

In the column of the presence or absence of the conflict, a character string indication whether the library conflicts with another library is stored. For example, the library "libA-2.0" that does not conflict with another library is stored in the list 21 in association with a character string "no conflict". On the other hand, since the library "libB-1.0" and the library "libB-2.0" conflict with each other, these libraries and character strings "conflict" are associated and stored in the list 21.

FIG. 7 is referred again. Next, the file output device 20 generates logical formulas 24 indicating the dependency relationship between the project "prjA" and the libraries (P3).

FIG. 9 is a schematic diagram illustrating a rule for encoding the dependency relationship of the libraries into the logical formula.

As illustrated in FIG. 9, a logical formula "A" indicates that a library A is used in the program. Then, a logical formula "¬A" indicates that the library A is not used in the program.

Then, a logical formula "¬A ∨B" indicates that the library A depends on a library B. Further, a logical formula "¬A ∨B" indicates that the library A and the library B conflict with each other.

Figure 10A:
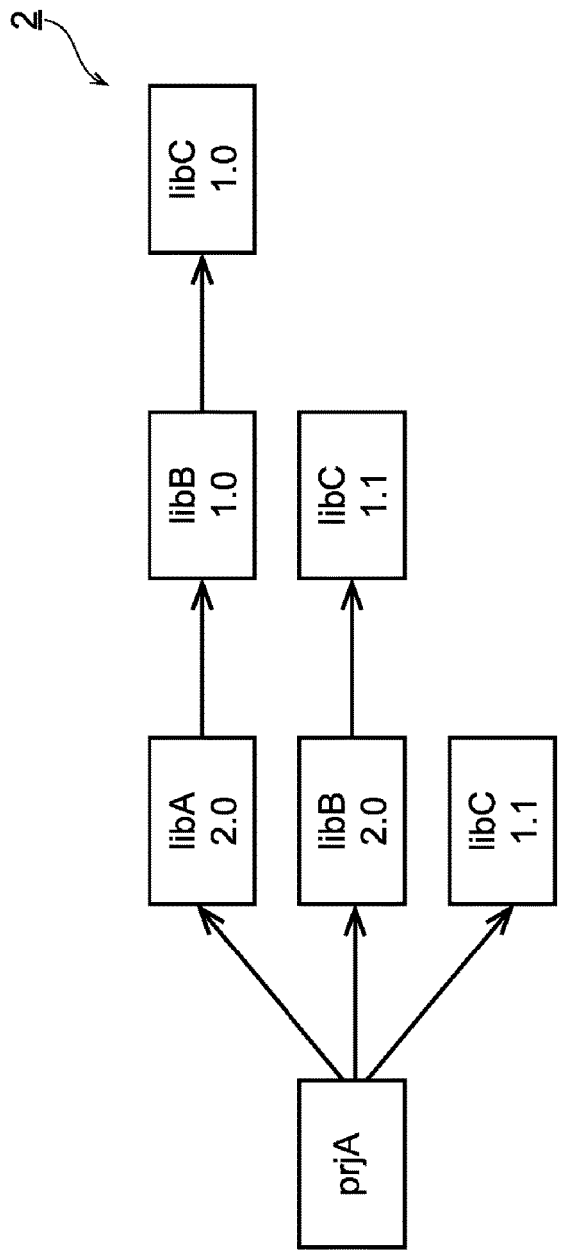
FIG. 10A is a schematic diagram of the dependency graph corresponding to the POM file in the first embodiment.
Figure 10B:
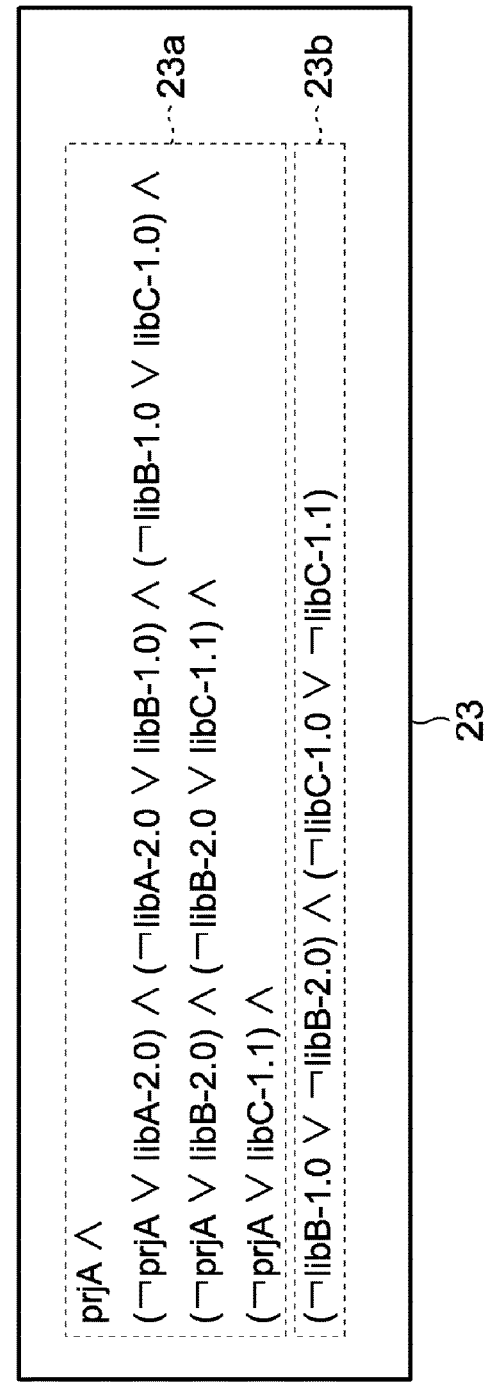
FIG. 10B is a schematic diagram of a logical formula corresponding to the dependency graph and a list.

FIG. 10A is a schematic diagram of the dependency graph 2 corresponding to the POM file 1. FIG. 10B is a schematic diagram of a logical formula 23 corresponding to the dependency graph 2 and the list 21.

As illustrated in FIG. 10B, the logical formula 23 is a logical formula of the Conjunctive Normal Form (CNF), which is a logical product of a plurality of clauses. In this example, the logical formula 23 has a formula 23a representing the dependency graph 2 and a formula 23b representing the list 21.

In the formula 23a, each clause separated by a logical product "∧" represents the dependency relationship between the libraries. As illustrated in FIG. 9, in each clause, the dependency relationship between the libraries is expressed by taking the logical sum of the negation of the propositional variable indicating the library and the propositional variable indicating another library. For example, the clause "¬A ∨ libA-2.0" indicates that the project "prjA" depends on the library "libA-2.0", and the clause "¬libA-2.0 ∨libB-1.0" indicates that the library "libA-2.0" depends on the library "lib-1.0". The file output device 20 identifies the dependency relationship between the libraries based on the POM file 1 (see. FIG. 1), and takes the logical sum of the negation of the propositional variable indicating the library of the dependency source and the propositional variable indicating the library of the dependency destination, thereby generating these clauses.

On the other hand, in the formula 23b, each clause separated by the logical product "∧" represents the conflict between the libraries. In this example, the clause "¬libB-1.0 ∨¬libB-2.0" represents that the library "libB-1.0" and the library "libB-2.0" conflict with each other. The clause "¬libC-1.0 ∨¬libC-1.1" represents that the library "libC-1.0" and the library "libC-1.1" conflict with each other. The file output device 21) identifies the libraries that conflict with each other by referring to the list 21 (see FIG. 8), and takes the logical sum of the negation of the propositional variables indicating these libraries, thereby generating these clauses.

In the present embodiment, the file output device 20 generates a plurality of logical formulas 24 obtained by modifying the logical formula 23.

Figure 11A:
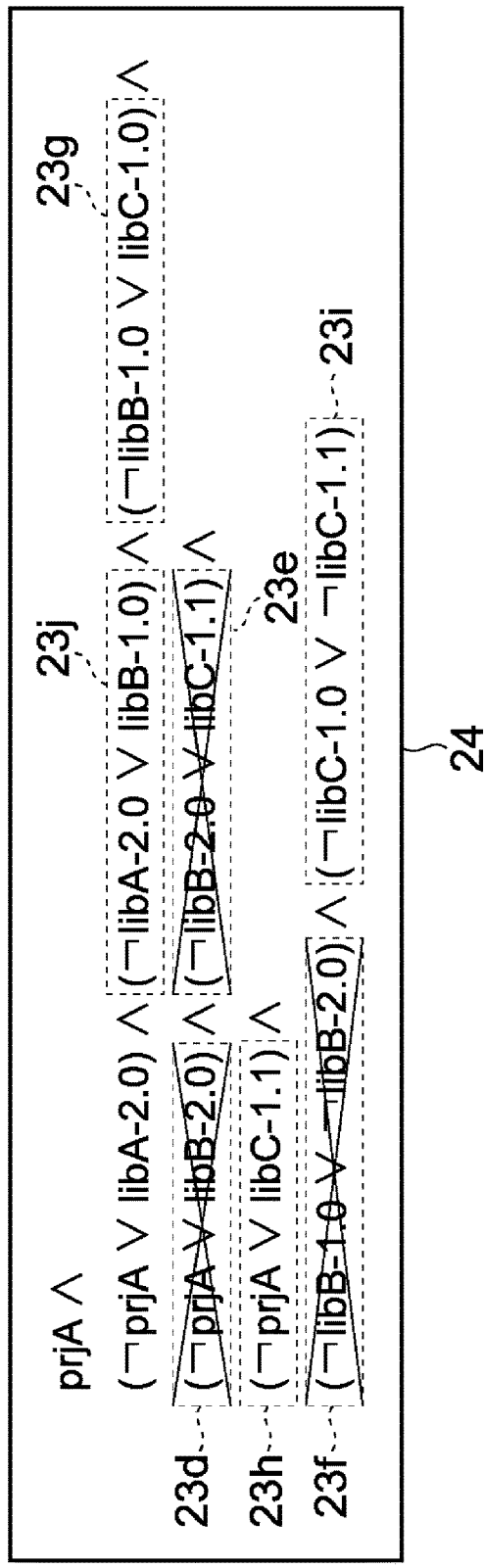
FIG. 11A is a schematic diagram of a single logical formula obtained by modifying the logical formula in the first embodiment.

FIG. 11A is a schematic diagram of the single logical formula 24 obtained by modifying the logical formula 23.

In the present embodiment, an attention is paid to the library "libB-1.0" and the library "libB-2.0" that conflict with each other in the logical formula 23. One of the library "libB-1.0" and the library "libB-2.0" is an example of a first library, and the other is an example of a second library. The logical formula 24 is obtained by deleting clauses 23d, 23e, and 23f including the library "libB-2.0" in these libraries from the logical formula 23 and leaving a clause 23j including the library "libB-1.0".

The logical formula 24 is a formula indicating that the project "prjA" depends on the library "libB-1.0" and does not depend on the library "libB-2.0". A clause 23i obtained by taking the logical sum of the negations of libraries "libC-1.0" and "libC-1.1" conflicting with each other is also left in this logical formula 24. One of these libraries "libC-1.0" and "libC-1.1" is an example of a third library, and the other is an example of a fourth library.

In the example of FIG. 11A, at least one truth value of three clauses 23g, 23h, and 23i is false for any combination of the truth values of each of "libC-1.0" and "libC-1.1". Therefore, the logical formula 24 becomes unsatisfiable, and the POM file represented by the logical formula 24 cannot resolve the conflict between the libraries.

Figure 11B:
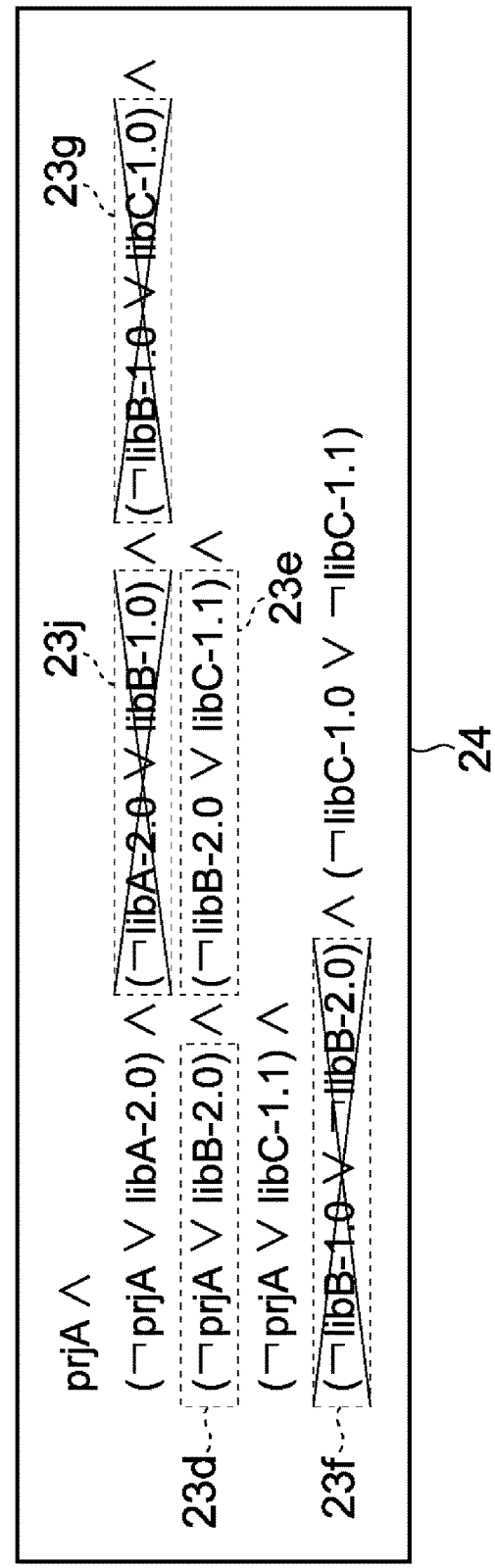
FIG. 11B is a schematic diagram of another logical formula obtained by modifying the logical formula in the first embodiment.

FIG. 11B is a schematic diagram of another logical formula 24 obtained by modifying the logical formula 23.

This logical formula 24 is a formula that deletes the clauses 23f, 23g, and 23j including the library "libB-1.0" from the logical formula 23, and leaves the clauses 23d and 23e including the library "libB-2.0". Since this logical formula 24 is satisfiable, the conflict between the libraries can be resolved by using the POM file represented by the logical formula 24. The respective values of the propositional variables that can satisfy this logical formula 24 are as follows.

"prjA": true
"libA-2.0": true
"libB-2.0": true
"libC-1.1": true
"libC-1.0": false In the present embodiment, the file output device 20 generates the logical formula 24 (see FIGS. 11A and 11B) for each of the plurality of libraries "libB-1.0" and "libB-2.0" that conflict with each other in this way. Each of these formulas 24 is a logic formula indicating that the program depends on only one of the plurality of libraries "libB-1.0" and "libB-2.0" that conflict with each other, and does not depend on a remaining library.

FIG. 7 is referred again. Next, the file output device 20 identifies a satisfiable logical formula 24 among the plurality of logical formulas 24, and outputs a POM file 26 corresponding to the satisfiable logical formula 24 (P4). For example, the file output device 20 identifies a satisfiability of logical formula 24 with a SAT (satisfiability) solver. The SAT solver is a solver capable of performing a process with high speed, and the file output device 20 can quickly identify the satisfiable logical formula 24 among the plurality of logical formulas 24.

Figure 12:
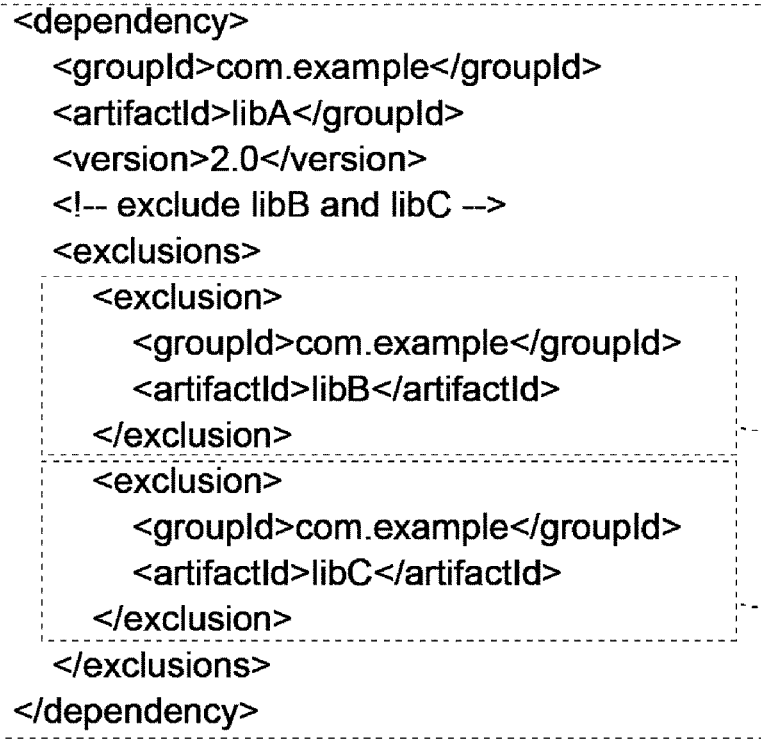
FIG. 12 is a schematic diagram of a POM file corresponding to the logical formula of FIG. 11B.

FIG. 12 is a schematic diagram of the POM file 26 corresponding to the logical formula 24 of FIG. 11B.

As illustrated in FIG. 12, the POM file 26 has a dependency element 26a and exclusion elements 26b and 26c described inside the dependency element 26a.

The dependency element 26a is an element indicating that the project "prjA" depends on the library "libA-2.0".

The exclusion element 26b is an element indicating that the library "libB" is not used inside the library "libA-2.0", and corresponds to the deletion of the clause 23) in the logical formula 24 of FIG. 11B.

The exclusion element 26c is an element indicating that the library "libC" is not used inside the library "libA-2.0", and corresponds to the deletion of the clause 23g in the logical formula 24 of FIG. 11B.

The file output device 20 outputs the POM file 26 for each satisfiable logical formula among the plurality of logical formulas 24. One of the plurality of POM files 26 is an example of a second definition file, and another POM files 26 is an example of a third definition file. This completes a basic process performed by the file output device 20.

According to the present embodiment described above, the file output device 20 generates the logical formulas 24, and outputs the POM file 26 corresponding to the satisfiable logical formula among the logical formulas 24. Since the conflict between the libraries is resolved in the POM file 26, an executable program that can operate independently can be obtained by building the project "prjA" using the POM file 26.

Moreover, the file output device 20 outputs the plurality of POM files 26 corresponding to the plurality of satisfiable logical formulas 24, respectively. Therefore, the program developer can select the POM file 26 according to his/her intention among the plurality of POM files 26.

Next, a description will, be given of the functional configuration of the file output device 20 according to the present embodiment.

Figure 13:
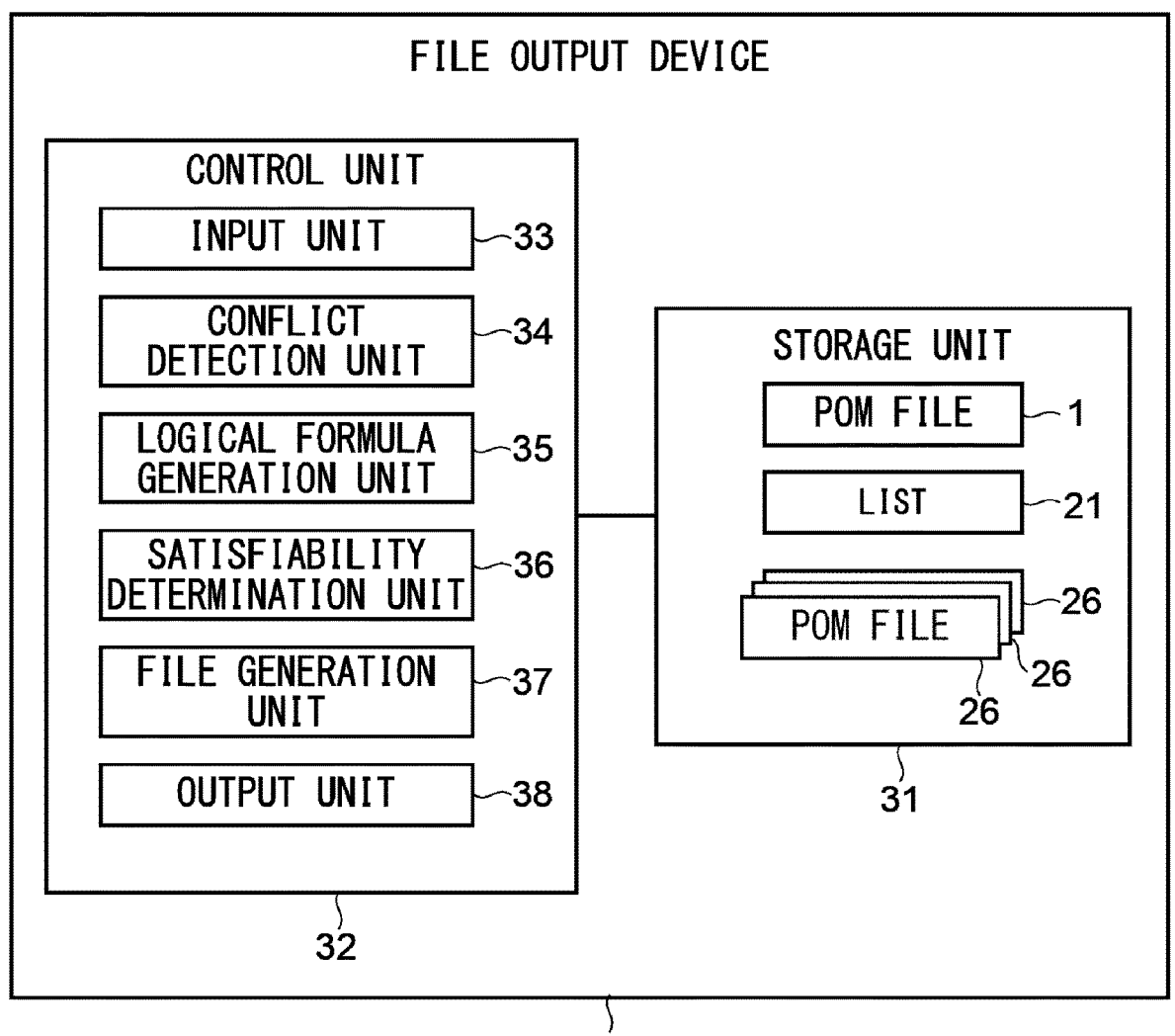
FIG. 13 is a functional configuration diagram of a file output device according to the first embodiment.

FIG. 13 is a functional configuration diagram of the file output device 20. As illustrated in FIG. 13, the file output device 20 has a storage unit 31 and a control unit 32.

The storage unit 31 stores the POM file 1, the list 21, and the POM files 26 described above.

The control unit 32 is a processing unit that controls each unit of the file output device 20, and includes an input unit 33, a conflict detection unit 34, a logical formula generation unit 35, a satisfiability determination unit 36, a file generation unit 37, and an output unit 38.

The input unit 33 is a processing unit that receives the input of the POM file 1 and stores the POM file 1 in the storage unit 31. As an example, the input unit 33 receives the input of the POM file 1 recorded on a recording medium such as a CD-ROM (Compact Disc-Read Only Memory), a DVD (Digital Versatile Disc), and a USB (Universal Serial Bus) memory. The input unit 33 may receive the input of the POM file 1 from an external device via communication with a network such as LAN (Local Area Network) or Internet.

The conflict detection unit 34 generates the list 21 based on the POM file 1, and detects the conflict between the libraries based on the list 21. As an example, the conflict detection unit 34 reads the POM file 1 and the POM file referenced by the library described in the POM file 1. Then, the conflict detection unit 34 identifies the names and the versions of all the libraries described in these POM files, and detects that the libraries with the same name but different versions conflict with each other. Then, based on the detection result, the conflict detection unit 34 generates the list 21 (see FIG. 8) that corresponds to either character string "conflict" or "no conflict" for each library, and stores the list 21 in the storage unit 31.

The logical formula generation unit 35 is a processing unit that generates the logical formula 24 based on the list 21 and the POM file 1. For example, the logical formula generation unit 35 identifies the libraries that conflict with each other based on the list 21. In the example of FIG. 8, the library "libB-1.0" and the library "libB-2.0" are identified by the logical formula generation unit 35 as the libraries that conflict with each other.

Then, as illustrated in FIG. 100, the logical formula generation unit 35 generates the logical formula 23 that combines, by the logical product, the formula 23a representing the dependency graph 2 of the POM file 1 (see FIG. 10A) and the formula 23b representing the libraries that conflict with each other.

The logical formula generation unit 35 analyzes the dependency relationship between the libraries in the POM file 1 and takes the logical product of the clauses indicating the dependency relationship between the two libraries, which can generate the formula 23a. The logical formula generation unit 35 finds the clause including the logical sum of the negation of the propositional variables indicating the two libraries that conflict with each other, and takes the logical product of these clauses, which can generate the formula 23b.

Next, the logical formula generation unit 35 generates the plurality of logical formulas 24 (FIGS. 11A and 11B) obtained by modifying the logical formula 23. For example, the logical formula generation unit 35 generates the logical formula 24 by deleting the clause including the library from the logical formula 23 for each of the libraries that conflict with each other. As described above, the logical formula 24 is a logical formula indicating that the program depends on only one of the plurality of libraries that conflict with each other, and does not depend on the remaining libraries.

The satisfiability determination unit 36 is the SAT solver, for example, and determines whether each of the plurality of logical formulas 24 is satisfiable.

FIGS. 14A and 14B are schematic diagrams illustrating examples of the determination results of the satisfiability determination unit 36.

FIG. 14A is a schematic diagram illustrating the determination result when the logical formula 24 is satisfiable. In this case, the determination result "result" becomes "sat" indicating satisfiable. Then, an example of a combination of propositions that makes the logical formula 24 true is output as a "model".

FIG. 14B is a schematic diagram illustrating the determination result when the logical formula 24 is unsatisfiable in this case, the determination result "result" becomes "unsat" indicating unsatisfiable. Then, a list of clauses that make the logical formula 24 unsatisfactory is output as "unsat-core".

FIG. 13 is refereed again. The file generation unit 37 is a processing unit that generates the POM file 26 corresponding to each logical formula 24 determined to be satisfiable by the satisfiability determination unit 36, and stores the POM file 26 in the storage unit 31.

As an example, the file generation unit 37 generates the POM file 26 by adding, to the POM file 1, an exclusion element in which the library included in the clause deleted from the logical formula 23 is described.

The output unit 38 is a processing unit that outputs each POM file 26 stored in the storage unit 31 to the recording medium such as the CD-ROM, the DVD or the USB memory. The output unit 38 may output the POM file 26 to the external device via communication with the network such as the LAN or the Internet.

Figure 15:
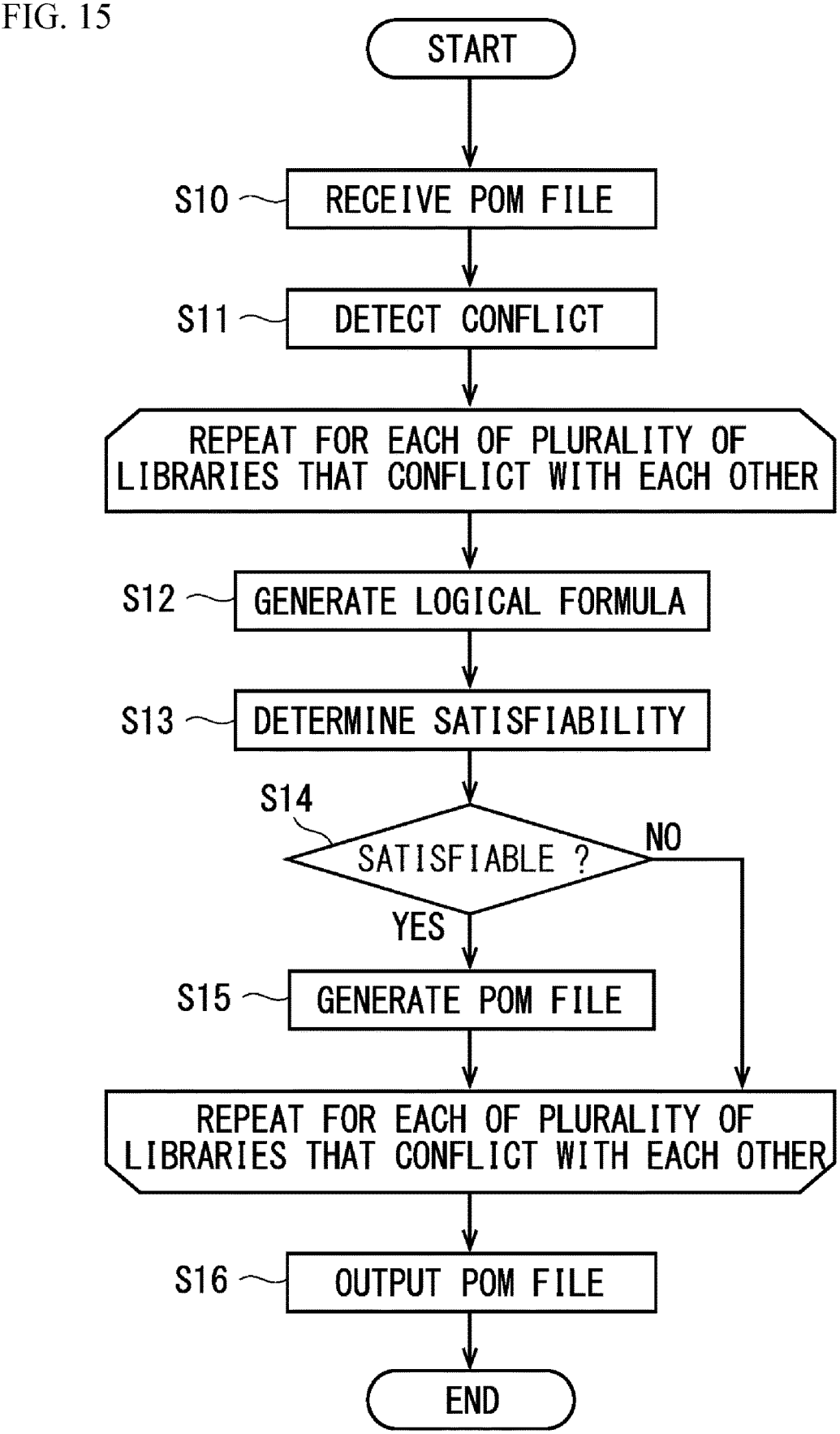
FIG. 15 is a flowchart of a file output method according to the first embodiment.

Next, a description will be given of a file output method according to the present embodiment. FIG. 15 is a flowchart of the file output method according to the present embodiment.

First, the input unit 33 receives the input of the POM file 1 and stores the POM file 1 in the storage unit 31 (step S10).

Next, the conflict detection unit 34 detects the conflict between the libraries based on the POM file 1, and generates the list 21 indicating the presence or absence of the conflict (step S11).

Next, the logical formula generation unit 35 generates the logical formula 24 (see FIGS. 11A and 11B) based on the list 21 and the POM file 1 (step S12).

In the present embodiment, the logical formula generation unit 35 generates the logical formula 24 by selecting one library from the plurality of libraries that conflict with each other in the list 21, and deleting the clause including the library from the logical formula 23. For example, in the example of FIG. 8, the logical formula generation unit 35 generates the logical formula 24 (see FIGS. 11A and 11B) by selecting the library "libB-1.0" from the libraries "libB-1.0" and "libB-2M" that conflict with each other, and deleting the library "libB-1.0" from the logical formula 23 (see FIG. 10B).

Next, the satisfiability determination unit 36 determines the satisfiability of the logical formula 24 (step S13).

Then, when the logical formula 24 is unsatisfiable (step S14: NO), the process returns to step S12. In this case, step S12 is executed for a library unselected yet among the plurality of libraries that conflict with each other in the list 21.

On the other hand, when the logical formula 24 is satisfiable (step S14: YES), the process proceeds to step S15.

In step S15, the file generation unit 37 generates the POM file 26 corresponding to the satisfiable logical formula 24, and stores the POM file 26 in the storage unit 31. For example, the file generation unit 37 generates the POM file 26 by adding, to the POM file 1, the exclusion element in which the library selected in step S12 is described, among the plurality of libraries that conflict with each other, as illustrated in FIG. 12.

After that, steps S12 to S15 are repeated for the library unselected yet from the plurality of libraries that conflict with each other.

Then, the output unit 38 outputs each POM file 26 stored in the storage unit 31 (step S16).

This completes the basic process of the file output method according to the present embodiment.

According to the present embodiment described above, when the plurality of libraries conflict, the logical formula generation unit 35 generates the logical formula 24 indicating that the source program depends on one library and does not depend on the remaining libraries. When the logical formula 24 is satisfiable, the output unit 38 outputs the POM file 26 reflecting the contents of the logical formula 24. Since the conflict between the libraries is resolved in the POM file 26, the executable program that can operate independently can be obtained by compiling the source program based on the POM file 26.

Moreover, since the file output device 20 automatically outputs the POM file 26 based on the logical formula 24, the program developer does not have to manually describe the POM file 26, and a burden on the program developer can be reduced.

Second Embodiment

Figure 16:
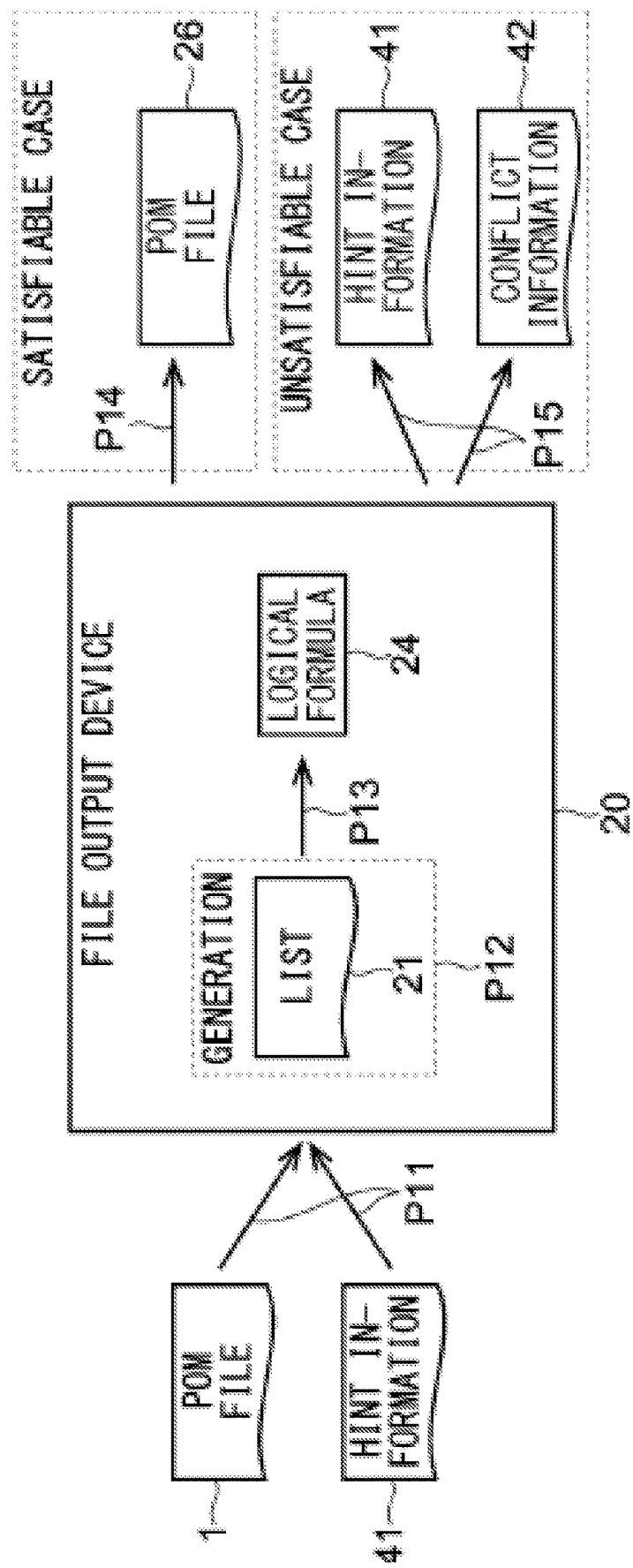
FIG. 16 is a schematic diagram illustrating the process of the file output device according to a second embodiment.

FIG. 16 is a schematic diagram illustrating the process of the file output device according to the present embodiment. In FIG. 16, corresponding elements to those in the first embodiment are designated by the same reference numerals, and the description of these elements is omitted.

In the present embodiment, the file output device 20 first receives the input of the POM file 1 and hint information 41 (P11). The POM file. 1 is the build definition file explained in FIG. 1.

FIG. 17A is a schematic diagram illustrating an example of the hint information 41. The hint information 41 is a file that describes the intention and the wisdom of the program developer. In the example of FIG. 17A, the hint information 41 has an artifactId element 41a indicating that this is a hint regarding the library "libB", and a substitutable element 41b described inside the artifactId element 41a.

The substitutable element 41b indicates the wisdom of the program developer that the library "libB" with a version "1.x" ($1.0 \leq x < 2.0$) can be substituted with the library "libB" with a version "2.x" ($2.0 \leq x < 3.0$).

FIG. 17B is a schematic diagram illustrating another example of the hint information 41. The substutable element 41b in the hint information 41 indicates the wisdom of the program developer that the library "libB" with the version "2.x" ($2.0 \leq x < 3.0$) can be substituted with the library "libB" with the version "1.x" ($1.0 \leq x < (2.0)$).

FIG. 16 is referred again. Next, the file output device 20 generates the list 21 based on the POM file 1 (P12). As illustrated in FIG. 8, the list 21 is a list in which the library is associated with the presence or absence of the conflict.

Next, the file output device 20 generates the logical formula 24 according to the POM the file 1, the list 21 and the hint information 41 (P13). For example, the file output device 20 identifies the two libraries that conflict with each other based on the list 21. In the example of FIG. 8, the file output device 20 identifies that the library "libB-1.0" and the library "libB-2.0" conflict with each other.

When the hint information 41 indicates that one of these libraries can be substituted with the other, the file output device 20 generates the logical formula 24 by deleting one of the libraries from the logical formula 23 and leaving only the other in the logical formula 23.

For example, the hint information 41 of FIG. 17A indicates that the library "libB-1.0" can be substituted with the library "libB-2.0". Therefore, when the hint information 41 of FIG. 17A is used, the file output device 20 generates the logical formula 24 by deleting the clauses 23j, 23g, and 23f (see FIG. 11B) including the "libB-1.0" from the logical formula 23.

FIG. 18A is a schematic diagram illustrating the logical formula 24 obtained when the hint information 41 of FIG. 17A is used in this way.

As illustrated in FIG. 18A, the logical formula 24 is a logical formula that deletes the clauses 23f, 23g, and 23j including the library "libB-1.0" from the logical formula 23, as in FIG. 11B. As described in the first embodiment, the logical formula 24 is satisfiable.

FIG. 18B is a schematic diagram illustrating the logical formula 24 generated by the output device 20 when the hint it 41 of FIG. 17B is used.

The hint information 41 of FIG. 17B indicates that the library "libB-2.0" can be substituted with the library "libB-1.0". In this case, the file output device 20 generates the logical formula 24 that deletes the clauses 23d, 23e, and 23f including the library "libB-2.0" from the logical formula 23, and leaves the clauses 23j and 23g including the library "libB-1.0", as in FIG. 11A. In the logical formula 24, the clauses 23a, 23h, and 23i including any of the libraries "libC-1.0" and "libC-1.1" that conflict with each other are left.

FIG. 16 is referred again. Next, the file output device 20 determines the satisfiability of the logical formula 24, and outputs the POM file 26 corresponding to the logical formula 24 when the logical formula 24 is satisfiable (P14).

For example, since the logical formula 24 (see FIG. 18A) is satisfiable based on the hint information 41 of FIG. 17A, the file output device 20 outputs the POM file 26 corresponding to the logical formula 24.

FIG. 19 is a schematic diagram of the POM file 26 corresponding to the logical formula 24 of FIG. 18A.

The POM file 26 is the similar to that described in FIG. 12, and has the dependency element 26a indicating that the project "prjA" depends on the library "libA-2.0". Further, the POM file 26 includes the exclusion element 26b corresponding to the deletion of the clause 23j in the logical formula 24 of FIG. 18A and the exclusion element 26c corresponding to the deletion of the clause 23g in the logical formula 24.

FIG. 16 is referred again. When the logical formula 24 is unsatisfiable, the file output device 20 outputs modified hint information 41 and conflict information 42 (P15).

For example, the logical formula 24 of FIG. 18B based on the hint information 41 of FIG. 17B is unsatisfiable. Therefore, in this case, the file output device 20 outputs the modified hint information 41 and the conflict information 42.

FIG. 20 is a schematic diagram of the conflict information 42 output by the file output device 20 when the hint information 41 of FIG. 17B is used.

The logical formula 24 of FIG. 18B indicates that the clauses 23g and 23h including the libraries "libC-1.0" and "libC-1.1" leave respectively and the project "prjA" depends on each of these libraries "libC-1.0" and "libC-1.1". Therefore, the file output device 20 determines that the logical formula 24 of FIG. 18B is unsatisfiable due to these libraries "libC-1.0" and "libC-1.1", and outputs the conflict information 42.

The conflict information 42 is a text file indicating that the above libraries "libC-1.0" and "libC-1.1" conflict with each other. In the example of FIG. 20, "libC-1.0" and "libC-1.1" are described as "conflicting libraries", and it is clearly indicated that they conflict with each other. In addition, the strings following "required by" describe the libraries or the project on which the libraries "libC-1.0" and "libC-1.1" depend.

The program developer can identify the libraries that conflict with each other, based on the conflict information 42.

FIG. 21 is a schematic diagram illustrating the modified hint information 41. In the present embodiment, information indicating that one of the two libraries that conflict with each other described in the conflict information 42 can be substituted for the other is added to the hint information 41.

In the example of FIG. 21, the hint information 41 is modified by adding an artifacId 41c indicating that this is a hint related to the library "libC" and a substitutable attribute 41d described inside the artifactId 41c to the hint information 41.

The substitutable attribute 41d indicates that the library "libC" with the version "1.0" can be substituted with the library "libC" with the version "1.1".

The file output device 20 does not determine whether the logical formula 24 is actually satisfiable by using the hint information 41 modified in this way, but it outputs the hint information 41 as a clue to make the logical formula 24 satisfiable.

This allows the program developer to understand that the conflict between these libraries may be resolved by substituting the library "libC" with the version "1.0" with the library "libC." with the version "1.1".

Next, the file output method according to the present embodiment will be described with reference to the functional configuration diagram of FIG. 13, and FIG. 22.

Figure 22:
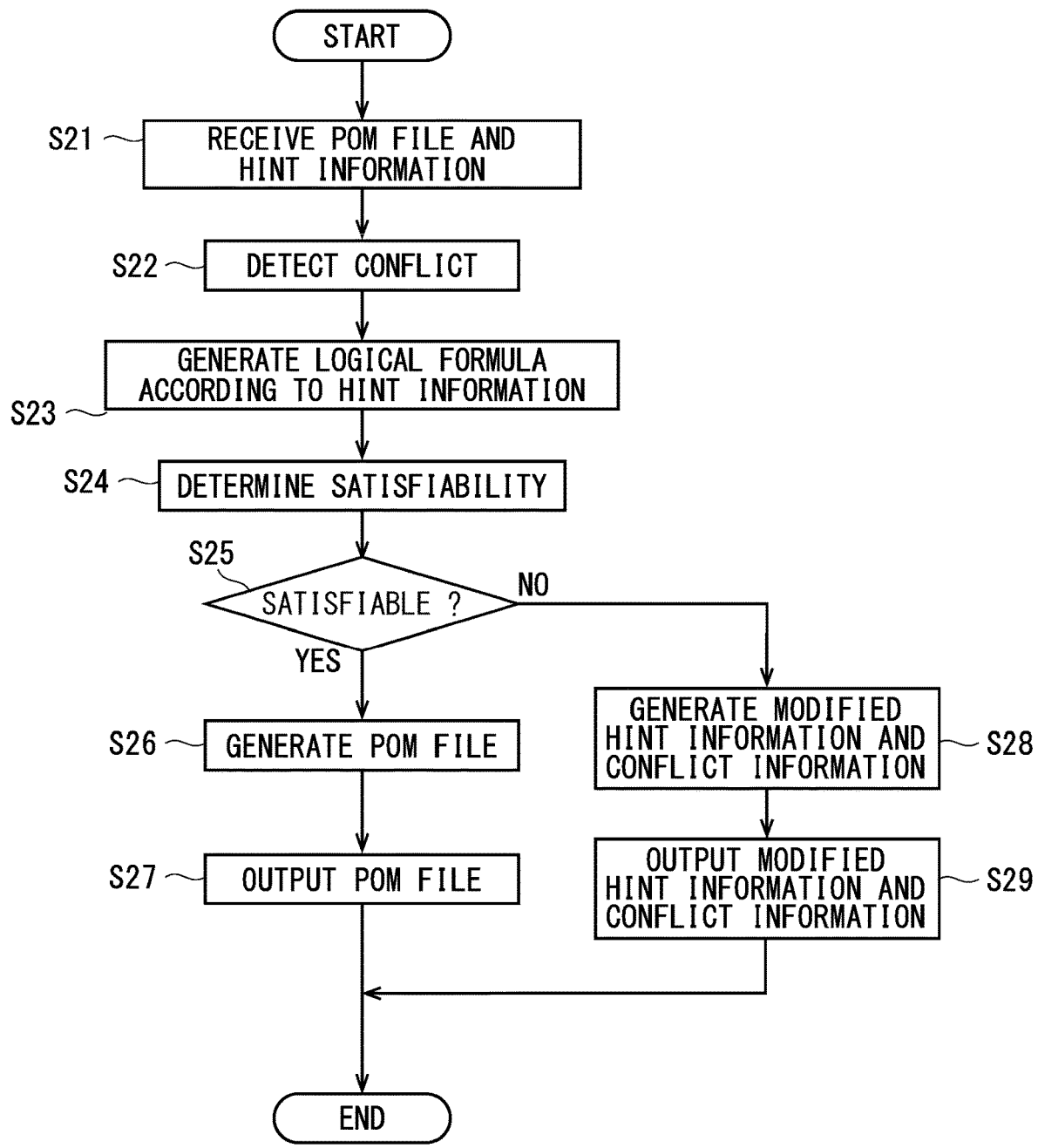
FIG. 22 is a flowchart of a file output method according to the second embodiment.

FIG. 22 is a flowchart of the file output method according to the present embodiment. First, the input unit 33 receives the Input of the POM file 1 and the hint information 41 and stores them in the storage unit 31 (step S21).

Next, the conflict detection unit 34 detects conflict between the libraries based on the POM file 1 and generates the list 21 indicating the presence or absence of the conflict (step S22).

Next, the logical formula generation unit 35 generates the logical formula 24 according to the POM file 1, the list 21, and the hint information 41 (step S23). For example, the logical formula generation unit 35 generates the logical formula 23 indicating the dependency relationship between the libraries based on the POM file 1. Then, the logical formula generation unit 35 identifies the libraries that conflict with each other in the list 21. Further, when the hint information 41 indicates that one of these libraries can be substituted with the other, the file output device 20 generates the logical formula 24 by deleting one of the libraries from the logical formula 23 and leaving only the other in the logical formula 23.

Next, the satisfiability determination unit 36 determines the satisfiability of the logical formula 24 (step S24).

Here, when the logical formula 24 is satisfiable (step S25: YES), the process proceeds to step S26. In step S26, the file generation unit 37 generates the POM file 26 corresponding to the logical formula 24, and stores the POM file 26 in the storage unit 31. For example, the file generation unit 37 generates the POM file 26 by adding the exclusion element in which the library deleted in step S23 is described, to the POM file 1.

Then, the output unit 38 outputs the POM file 26 stored in the storage unit 31 (step S27).

On the other hand, when the logical formula 24 is unsatisfiable (step S25: NO), the process proceeds to step S28. In step S28, the file generation unit 37 generates the modified hint information 41 and the conflict information 42, and stores them in the storage unit 31.

Then, the output unit 38 outputs the modified hint information 41 and the conflict, information 42 in the storage unit 31 (step S29).

This completes the basic process of the file output method according to the present embodiment.

According to the present embodiment described above, the logical formula generation unit 35 generates the logical formula 24 according to the hint information 41, and the output unit 38 outputs the POM file 26 reflecting the contents of the logical formula 24. The hint information 41 is information that reflects the intention and the wisdom of the program developer, and reflects the intention of the program developer that a certain library can be substituted with another library, for example. Therefore, the output unit 38 can output the POM file 26 that reflects the intention of the program developer.

When the logical formula 24 is not satisfiable, the output unit 38 outputs the conflict information 42 and the modified hint information 41. Since the conflict information 42 (see FIG. 20) is information indicating the libraries that conflict with each other, the program developer can identify each of the libraries that conflict with each other, based on this information. Further, the program developer can understand that the conflict between the libraries may be resolved by substituting the certain library with another library, based on the substitutable attribute 41d (see FIG. 21) added to the modified hint information 41.

(Hardware Configuration)

Next, a description will be given of the hardware configuration of the file output device 20 according to each of the first embodiment and the second embodiment.

Figure 23:
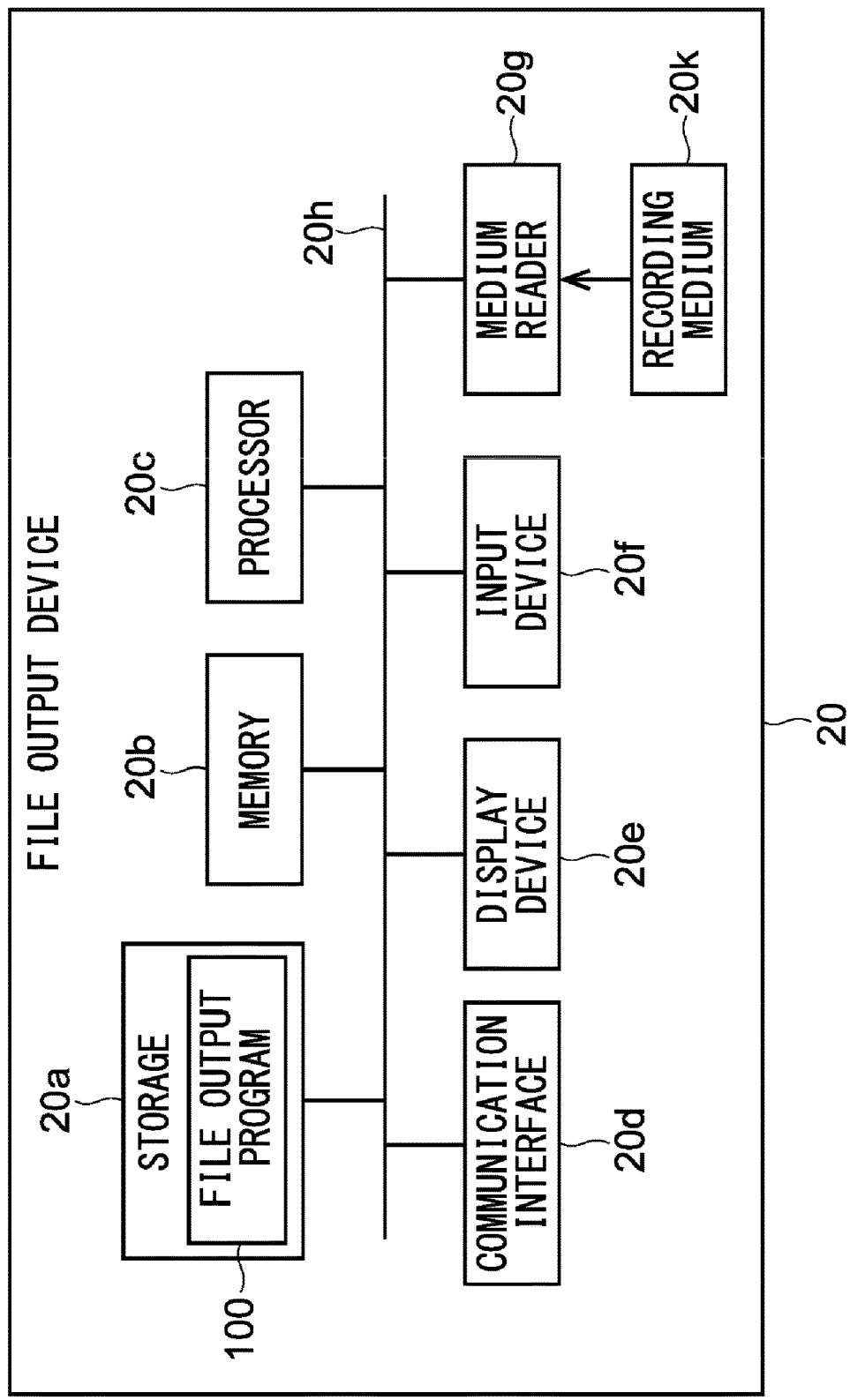
FIG. 23 is a hardware configuration diagram of the file output device according to each of the first embodiment and the second embodiment.

FIG. 23 is a diagram illustrating the hardware configuration of the file output device 20. As illustrated in FIG. 23, the file output device 20 includes a storage 20a, a memory 20b, a processor 20c, a communication interface 20d, a display device 20e, an input device 20f, and a medium reader 20g. These elements are connected to each other by a bus 20h.

The storage 20a is a non-volatile storage device such as an HDD (Hard Disk Drive) or an SSD (Solid State Drive), and stores a file output program 100 according, to the present embodiment.

The file output program 100 may be recorded on a computer-readable recording medium 20k, and the processor 20e may read the file output program 100 from the recording medium 20k via the medium reader 20g.

Examples of such a recording medium 20k include physically portable recording media such as a CD-ROM (Compact Disc-Read Only Memory), a DVD (Digital Versatile Disc), and a USB (Universal Serial Bus) memory. Further, a semiconductor memory such as a flash memory, or a hard disk drive may be used as the recording medium 20k. The recording medium 20k is not a temporary medium such as a carrier wave having no physical form.

Further, the file output program 100 may be stored in a device connected to a public line, the Internet, the LAN (Local Area Network), or the like. In this case, the processor 20c may read and execute the file output program 100.

Meanwhile, the memory 20b is hardware that temporarily stores data, such as a DRAM (Dynamic Random Access Memory), and the file output program 100 is deployed on the memory 20b.

The processor 20c is hardware such as a CPU (Central Processing Unit) and a GPU (Graphical Processing Unit) that control each element of the file output device 20. Further, the processor 20c executes the file output program 100 in cooperation with the memory 20b.

In this way, the control unit 32 (see FIG. 13) of the file output device 20 is realized by executing the file output program 100 in cooperation with the memory 20b and the processor 20c. The control unit 32 includes the input unit 33, the conflict detection unit 34, the logical formula generation unit 35, the satisfiability determination unit 36, the file generation unit 37, and the output unit 38.

The storage unit 31 (see FIG. 13) is realized by the storage 20a and the memory 20b.

Moreover, the communication interface 20d is hardware such as a NIC (Network Interface Card) for connecting the file output device 20 to the network such as the LAN or the Internet.

The display device 20e is hardware such as a liquid crystal display and a touch panel for displaying various types of information.

Further, the input device 20f is hardware such as a keyboard and a mouse for inputting various data to the file output device 20 by the program developer.

The medium reader 20g is hardware such as a CD drive, a DVD drive, and a USB interface for reading the recording medium 20k.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer-readable medium having stored therein a program for causing a computer to execute a process, the process comprising:
   receiving an input of a first definition file indicating that a first program depends on a first library and a second library among a plurality of libraries, and a first hint information indicating that the second library is able to be substituted with the first library;
   detecting a conflict between the first library and the second library in the first program based on the first definition file;
   generating a list indicating whether the plurality of libraries conflict with each other;
   generating a logical formula indicating that the first program depends on the first library, a third library and a fourth library among the plurality of libraries, and does not depend on the second library, based on the first definition file, the list and the first hint information; and
   generating second hint information by adding information indicating that one of the third library and the fourth library is able to be substituted by the other to the first hint information to output the second hint information when the logical formula is unsatisfiable.

\* \* \* \* \*